United States Patent
Mullins

(10) Patent No.: US 6,638,446 B1
(45) Date of Patent: Oct. 28, 2003

(54) LOWER REACTIVITY BLENDS OF CALCIUM HYPOCHLORITE AND MAGNESIUM SULFATE

(75) Inventor: Richard M. Mullins, Cape Coral, FL (US)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 10/271,375

(22) Filed: Oct. 15, 2002

(51) Int. Cl.[7] .............................. C01B 11/06; C11D 7/54
(52) U.S. Cl. .............................. 252/187.28; 252/187.1; 252/187.3; 510/302; 510/367; 423/474
(58) Field of Search .................. 252/187.28, 187.3, 252/187.1; 510/302, 367; 423/474

(56) References Cited

U.S. PATENT DOCUMENTS

| | | | |
|---|---|---|---|
| 3,668,134 A | 6/1972 | Lamberti et al. ............. | 252/89 |
| 3,669,891 A | 6/1972 | Greenwood et al. .......... | 252/90 |
| 3,793,216 A | 2/1974 | Dychdala et al. ....... | 252/187 H |
| 3,969,546 A | 7/1976 | Saeman ..................... | 427/213 |
| 4,005,028 A | 1/1977 | Heckert et al. .............. | 252/99 |
| 4,048,351 A | 9/1977 | Saeman et al. ............. | 427/213 |
| 4,051,056 A | 9/1977 | Hartman ..................... | 252/99 |
| 4,071,605 A | 1/1978 | Wojtowicz .................. | 423/462 |
| 4,118,524 A | 10/1978 | Saeman ..................... | 427/213 |
| 4,146,676 A | 3/1979 | Saeman et al. ............. | 428/403 |
| 4,174,411 A | 11/1979 | Saeman et al. ............. | 427/214 |
| 4,201,756 A | 5/1980 | Saeman et al. ............. | 423/266 |
| 4,216,027 A | 8/1980 | Wages ......................... | 134/36 |
| 4,289,640 A | 9/1981 | Falivene ..................... | 252/95 |
| 4,380,533 A | 4/1983 | Wojtowicz .................. | 423/473 |
| 4,539,179 A | 9/1985 | Meloy ......................... | 422/28 |
| 4,615,794 A | 10/1986 | Belanger .................... | 208/181 |
| 4,668,475 A | 5/1987 | Meloy ......................... | 422/37 |
| 4,931,207 A | 6/1990 | Cramer et al. ......... | 252/187.26 |
| 5,610,126 A | 3/1997 | Barford et al. ............. | 510/191 |
| 5,707,534 A | 1/1998 | Del Corral et al. ......... | 210/755 |
| 5,756,440 A | 5/1998 | Watanabe et al. ........... | 510/191 |
| 5,888,528 A | 3/1999 | Wellinghoff et al. ........ | 424/405 |
| 5,914,040 A | 6/1999 | Pescher et al. ............. | 210/638 |
| 5,958,853 A | 9/1999 | Watanabe ................... | 510/192 |

*Primary Examiner*—Joseph D. Anthony
(74) *Attorney, Agent, or Firm*—Williams A. Simons; Wiggin & Dana LLP

(57) ABSTRACT

A non-Division 5.1 Oxidizer composition consisting essentially of a blend of hydrated calcium hypochlorite with magnesium sulfate heptahydrate, wherein the blend contains at least about 17% by weight of water based on the total weight of the blend.

8 Claims, No Drawings

LOWER REACTIVITY BLENDS OF CALCIUM HYPOCHLORITE AND MAGNESIUM SULFATE

BACKGROUND OF THE INVENTION

1. Field of the Invention

The present invention relates to a composition having lower reactivity containing selected mixtures of hydrated calcium hypochlorite with magnesium sulfate heptahydrate.

2. Brief Description of Art

Hydrated calcium hypochlorite is a strong oxidizer and as such can cause a severe increase in the burning rate of combustible material with which it comes in contact. This oxidation characteristic can cause problems both in the transport and storage of the product. For example, fires involving calcium hypochlorite can be quite vigorous, particularly when combustible material is present, including the product's packaging material itself (e.g., plastic, cardboard). The blends of hydrated calcium hypochlorite and magnesium sulfate heptahydrate of the invention are not classified as a "Division 5.1 Oxidizer" (i.e. they do not increase the burning rate of combustible material) as measured by an internationally recognized test standard, i.e., the United Nations Protocol: Transport of Dangerous Goods: Manual of Tests and Criteria, Section 34; Classification Procedures, Test Methods, and Criteria relating to Oxidizing Substances of Division 5.1.

Products that are "Division 5.1 Oxidizers" are by definition "dangerous goods" for purposes of transport. The following references have discussed this fire-causing problem and offered solutions to it.

U.S. Pat. No. 3,793,216 (Feb. 19, 1974) (assigned to Pennwalt) teaches adding water in the form of a hydrated inorganic salt to anhydrous calcium hypochlorite (less than 1% water) so that the total resulting water in the blend was from 3 to 13% resulting in a product that "provides resistance to exothermic, self-propagating decomposition when contacted by flame, spark, or a contaminating organic substance". The test used in this patent to verify this property was an "ignition test", which contacts the test sample (from 10 to 500 grams) with a lit match, or a drop of glycerin or 2-propanol. Ignition and self-propagation of burning are indicators of failure. Blends that have a delayed reaction, a less vigorous reaction, or a localized reaction compared to anhydrous calcium hypochlorite were considered to be successful blends. However, this "ignition test" is not a demanding test. Since no fuel is present the procedure does not test the oxidizing properties, i.e., they could still increase the burning rate of combustible materials. In fact, as will be shown below, many blend products described by this Pennwalt patent pass this ignition test but would still be classified as "Division 5.1 Oxidizers".

U.S. Pat. No. 4,201,756 (May 6, 1980), (assigned to Olin) teaches the coating of calcium hypochlorite with a plurality of layers of inorganic salts. The first layer must be comprised of salts of Periodic Table Group I alkali metal salts (sodium, potassium, lithium, rubidium, cesium or francium.) The salt must be a chloride, chlorate, nitrate, bromide, bromate, or sulfate. The first layer forms a barrier so that incompatible salts such as basic aluminum sulfate, alkalized magnesium sulfate, and sodium borates may be coated with a second layer on the pre-coated calcium hypochlorite without physical contact with the calcium hypochlorite. See column 17, lines 36 to 54. The layers of salt form a physical barrier, which resists dusting and degradation during handling, and also decreases propensity for ignition and self-sustained decomposition when contacted by a lighted match or incompatible organic materials.

There are many differences between this Olin patent and the present invention. First, the requirement that an inert alkaline salt (such as sodium chloride) be added as a barrier between calcium hypochlorite and a material such as magnesium sulfate heptahydrate is not necessary. Second, the requirement that the final water content of the coated calcium hypochlorite be between 0.5 and 10% is actually counter-productive for reducing the oxidizing behavior of calcium hypochlorite. As such, the mechanism is different from that disclosed in this invention, which involves physically mixing the two substances so that they are in physical contact with each other, and maintaining a water content of at least 17%.

The best indicator of the difference between the two ideas is shown using Example XIV in the Olin patent. The example shows that calcium hypochlorite encapsulated with sodium chloride (approximately 21% by weight) prevented ignition of the material when contacted with a lighted match, i.e., it failed to undergo self-sustained decomposition. Our experiments show that physically blending 21% sodium chloride with calcium hypochlorite actually accelerates burning. As stated above, the mechanism is therefore different.

Accordingly, there is a need in this art to produce a calcium hypochlorite product that is not classified as a Division 5.1 Oxidizer and which has enhanced safety (i.e. diminished fire producing) properties. The present invention provides a solution to that need.

BRIEF SUMMARY OF THE INVENTION

Therefore, one aspect of the present invention is directed to non-Division 5.1 Oxidizer compositions consisting essentially of a blend of hydrated calcium hypochlorite and magnesium sulfate heptahydrate, wherein the water content of the blend is at least about 17% by weight of the blend.

These blends of the present invention are not Division 5.1 Oxidizers and will produce fires of dramatically diminished intensity compared to the above-noted prior art blends. Because the products of the present invention are not classified as Division 5.1 Oxidizers, they are not considered dangerous goods for purposes of transport and thus their transportation costs are lower than the above-noted prior art blends.

Also due to the dramatically reduced intensity of any fire involving the blends (compared to currently marketed calcium hypochlorite dihydrate products) the public good is served by the greatly enhanced safety in the storage and transportation of the product.

DETAILED DESCRIPTION OF THE INVENTION

The term "non-Division 5.1 Oxidizer composition" as used in the present specification and claims refers to any blend of calcium hypochlorite hydrate and magnesium sulfate heptahydrate that is not classified as UN Division 5.1 Oxidizer according to standard testing procedures now in effect.

The term "blend" is used in the present specification and claims refer to any homogeneous or near homogeneous mixture of the two critical materials. It does not include encapsulated or layered products such as covered in U.S. Pat. No. 4,201,756.

The term "hydrated" as used in conjunction with calcium hypochlorite products in the present specification and claims refers to any calcium hypochlorite product that has a water content of at least 5% by weight of calcium hypochlorite product. Preferably, the compositions of the present invention consist of commercial "hydrated" (5.5% to 16% water) calcium hypochlorite, CAS number [7778-54-3] and magnesium sulfate heptahydrate, CAS number [10034-99-8]. These preferred blends do not accelerate burning and are therefore non-oxidizers (as measured by the industry standard oxidizer classification test, i.e., United Nations Protocol Transport of Dangerous Goods—Oxidizing Substances of Division 5.1).

The composition preferably contains at least about 25% by weight of magnesium sulfate heptahydrate and less than about 75% by weight of hydrated calcium hypochlorite. More preferably, these compositions contain from about 25% to about 40% magnesium sulfate heptahydrate and about 60% to about 75% by weight of hydrated calcium hypochlorite.

Also, the amount of water in the blend should be at least about 17% by weight of the total blend; more preferably, about 18% to about 24% by weight of the blend. The granular magnesium sulfate heptahydrate is physically blended with granular calcium hypochlorite to produce an essentially homogeneous granular mixture. As stated above, the blends are not classified as UN Division 5.1 oxidizers.

The composition may also contain small amounts of other materials as long as the presence of those materials does not cause the resulting blend to be classified as a Division 5.1 Oxidizer.

The amount of water in the blend may be calculated by any standard analytical method for measuring water in chemical blends like these. Our preferred method is thermogravimetric analysis (TGA).

The granular blended products of the present invention are ready for packaging, storage, shipping and use in the purification of water and the like. In some cases, it may be desirable to form tablets and other shaped products from these granular blends. Specifically, the blends are useful as water treatment sanitizers (e.g. in swimming pools and spas), and are especially safer to transport and store than calcium hypochlorite itself.

The present invention is further described in detail by means of the following Examples and Comparisons. All parts and percentages are by weight and all temperatures are degrees Celsius unless explicitly stated otherwise.

EXAMPLES

The test for oxidizing substances described in Section 34 of the United Nations Protocol was used to determine the characteristics of the various blends listed in the table below. This test is much more demanding than the glycerin "ignition" test (described earlier), requiring the presence of a substantial amount, i.e., up to 50% by weight, of a fuel (cellulose) rather than one drop of potential fuel. The detailed test method is described in the United Nations Recommendations on the Transport of Dangerous Goods; Manual of Tests and Criteria; Third Revised Edition; Section 34 "Classification Procedures, Test Methods and Criteria Relating to Oxidizing Substances of Division 5.1. In the test, the relative burning rates of the various calcium hypochlorite products are compared to those of other known oxidizers. On the basis of this test, a product can be defined as an oxidizer or a non-oxidizer. The test method states that "This test method is designed to measure the potential for a solid substance to increase the burning rate or burning intensity of a combustible substance when the two are thoroughly mixed. Tests are conducted on the substance to be evaluated mixed with dry fibrous cellulose in mixing ratios of 1:1 and 4:1, by mass, of sample to cellulose. The burning characteristics of the mixtures are compared with the standard 3:7 mixture, by mass, of potassium bromate to cellulose. If the burning time is equal to or less than this standard mixture, the burning times should be compared with those from packing group I or II reference standards, 3:2 and 2:3, by mass of potassium bromate to cellulose respectively."

By definition, a substance that is not Division 5.1 Oxidizer (i.e., not an oxidizing substance) is any substance which, in both the 4:1 and 1:1 sample-to-cellulose ratio (by mass) tested, does not ignite and burn, or exhibits mean burning times greater than that of a 3:7 mixture (by mass) of potassium bromate and cellulose.

The following blends of both hydrated and anhydrous calcium hypochlorite with other materials were evaluated using the test method discussed above.

TABLE 1

Testing results of various calcium hypochlorite (anhydrous and hydrated) blends using the UN Division 5.1 oxidizer classification test.

| Example | Blend Components | Ratio | % $H_2O$ in blend | 5.1 Oxidizer |
|---|---|---|---|---|
| | Blends with "anhydrous" $Ca(OCl)_2$ | | | |
| 1 | $Ca(OCl)_2/CaSO_4.2H_2O$ | 80/20 | 5.0 | Yes |
| 2 | $Ca(OCl)_2/Na_2B_4O_7.5H_2O$ | 80/20 | 7.0 | Yes |
| 3 | $Ca(OCl)_2/Na_3PO_4.12H_2O$ | 85/15 | 9.5 | Yes |
| 4 | $Ca(OCl)_2/MgSO_4.7H_2O$ | 90/10 | 6.0 | Yes |
| 5 | $Ca(OCl)_2/MgSO_4.7H_2O$ | 75/25 | 13.5 | Yes |
| 6 | $Ca(OCl)_2/MgSO_4.7H_2O$ | 70/30 | 16.0 | Yes |
| | Blends with "hydrated" $Ca(OCl)_2$ | | | |
| 7 | $Ca(OCl)_2.2H_2O/CaSO_4.2H_2O$ | 80/20 | 9.0 | Yes |
| 8 | $Ca(OCl)_2.2H_2O/Na_2B_4O_7.5H_2O$ | 80/20 | 11.0 | Yes |
| 9 | $Ca(OCl)_2.2H_2O/Na_3PO_4.12H_2O$ | 85/15 | 13.8 | Yes |
| 10 | $Ca(OCl)_2.2H_2O/MgSO_4.7H_2O$ | 90/10 | 10.5 | Yes |
| 11 | $Ca(OCl)_2.2H_2O/MgSO_4.7H_2O$ | 75/25 | 17.3 | No |
| 12 | $Ca(OCl)_2.2H_2O/MgSO_4.7H_2O$ | 70/30 | 20.5 | No |

Note that the tests were run both with anhydrous (less than 1% water) and hydrated (6% water) calcium hypochlorite, although it should be noted that hydrated calcium hypochlorite did not exist on a commercial basis when the earlier Pennwalt work was done.

The tests show that the first four blends in the table (Examples 1–4), while they are within the scope of the Pennwalt patent, do not pass the UN Division 5.1 Oxidizer test. All are classified as oxidizers by that test.

The only blends that pass the UN Division 5.1 Oxidizer (i.e., are not oxidizers) are the 75/25 and 70/30 hydrated cal hypo/$MgSO_4.7H_2O$ blends (Examples 11 and 12). Note that neither the 75/25 nor the 70/30 anhydrous calcium hypochlorite/$MgSO_4.7H_2O$ blends (Examples 5 and 6) pass the UN Division 5.1 Oxidizer test. Both the 75/25 and 70/30 hydrated cal hypo/$MgSO_4.7H_2O$ blends are outside of the scope of the Pennwalt patent for at least two reasons. First, as stated earlier, hydrated calcium hypochlorite did not exist commercially at that time, and, second, the products both contain substantially more than 13% water cited in the Pennwalt patent.

Further testing also showed that the 70/30 blend of hydrated calcium hypochlorite and magnesium sulfate heptahydrate did not accelerate the burning of the product in 5-lb. plastic bottles. The bottles containing the blends of Examples 11 and 12, when artificially set on fire using kerosene and a torch burned slowly, showing a burn rate similar to the empty plastic packages themselves. Conversely, calcium hypochlorite hydrate alone in the same quantity and packaging, burned quite vigorously.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A non-Division 5.1 Oxidizer composition consisting essentially of a blend of hydrated calcium hypochlorite with magnesium sulfate heptahydrate, wherein the blend contains at least about 17% by weight of water based on the total weight of the blend.

2. The composition of claim 1 wherein the composition contains at least 25% by weight of magnesium sulfate heptahydrate and less than about 75% by weight of hydrated calcium hypochlorite.

3. The composition of claim 1 wherein the composition contains about 25% to about 40% by weight of magnesium sulfate heptahydrate and about 60% to about 75% of hydrated calcium hypochlorite.

4. The composition of claim 1 wherein the amount of water in the composition is from about 18% to about 24% by weight of the composition.

5. A non-Division 5.1 Oxidizer composition consisting of a blend of hydrated calcium hypochlorite with magnesium sulfate heptahydrate, wherein the blend contains at least 17% by weight of water based on the total weight of the blend.

6. The composition of claim 5 wherein the composition contains at least 25% by weight of magnesium sulfate heptahydrate and less than about 75% by weight of hydrated calcium hypochlorite.

7. The composition of claim 6 wherein the composition contains about 25% to about 40% by weight of magnesium sulfate heptahydrate and about 60% to about 75% of hydrated calcium hypochlorite.

8. The composition of claim 7 wherein the amount of water in the composition is about 18% to about 24% by weight of the composition.

* * * * *